United States Patent [19]
Christoff

[11] 3,921,122
[45] Nov. 18, 1975

[54] TRACK GENERATOR
[75] Inventor: James T. Christoff, Lynn Haven, Fla.
[73] Assignee: The United States of America as represented by the Secretary of the Navy, Washington, D.C.
[22] Filed: July 9, 1973
[21] Appl. No.: 379,515

[52] U.S. Cl.............. 340/3 R; 340/3 C; 343/5 DP; 343/5 EM
[51] Int. Cl.² .......................................... G01S 9/66
[58] Field of Search........... 340/3 C, 3 R; 343/5 DP, 343/5 EM

[56] References Cited
UNITED STATES PATENTS
3,543,269  11/1970  Dudley............................ 343/5 EM

*Primary Examiner*—Richard A. Farley
*Attorney, Agent, or Firm*—Richard S. Sciascia; Don D. Doty; Harvey A. David

[57] ABSTRACT

A signal processing and display digital technique is described in connection with a hazard avoidance sonar system whereby data generated relatively slowly is accumulated digitally in storage and read out repetitively at a faster rate to avoid flicker on a cathode ray tube display. Logic means are provided for periodically inserting a new line of data in place of the oldest data line only, whereby a historical display is maintained while also showing progression of parameters represented by the data.

11 Claims, 3 Drawing Figures

TRACK GENERATOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to the field of electronic data accumulation and display, and more particularly to a signal processing and video display system that is useful in improving sonar target detection and tracking in a high noise level environment, for example, in a hazard avoidance sonar system for high speed water borne vehicles such as are typified by hydrofoil boats, or the like.

For such use it is desirable to have forward looking sonar equipment that can provide a visual indication of the presence and ranges of objects in the path of travel of the sonar carrying vehicle, and preferably includes a display that retains a historical record or track of the changes of range as the vehicle approaches the object.

DESCRIPTION OF THE PRIOR ART

Both a high noise environment and the inherently low information input rate characteristic of sonars have made it necessary to seek means for increasing the signal to noise ratio at the display and means for avoiding display flicker. It has been known in the past that recognition of a target signal among noise signals on a display, such as a high persistance cathode ray tube, sensitized paper recorder, or the like can be improved by arranging successive display sweeps in side-by-side relation to generate a characteristic pattern that a human observer readily recognizes as being indicative of a target. Also, it has been known in the past that flicker, often associated with cathode ray tube display of data presented at the rate at which it is periodically received, can be avoided by increasing the display frame rate through the agency of a higher rate repetitive readout of data from memory means which is updated at the data reception rate. One example of such a system is described in U. S. Pat. No. 3,543,269 wherein data received at one rate is converted to digital form, stored in shift register memory means, and repetitively read out at a higher repetition rate. In that system, which is described for use with radar having a much higher pulse repetition rate than does sonar, stored data is periodically replaced en toto with updated data. The result is a non-historical display.

With respect to the ability to generate a historical track of a parameter, such as target range that changes with time, it has been proposed to use high persistance cathode ray tubes, storage or memory type cathode ray tubes, or relatively complex specific address memory means from which the target position data can be repeatedly recalled. High persistance cathode ray tubes, while simple, have the disadvantage of smear and bloom of the images over a period of time. Storage type cathode ray tubes have the ability to retain good images over an indefinite time period but when the storage face is full to capacity it becomes necessary to clear all data therefrom before more data can be added. Thus, a historical track would have to be begun anew without the benefit of the previous record.

SUMMARY OF THE INVENTION

The present invention aims to overcome most or all of the aforementioned disadvantages of the prior art in providing improved signal processing and display, for example, in a target tracking sonar system which is admirably suited to use as a hazard avoidance aid. To this end the invention utilizes a novel combination of digital processing and a short persistence cathode ray display to provide a flicker free presentation wherein target returns are arranged in side-by-side relation, are periodically updated to show relative motion, e.g., range changes with respect to time, and to create a dynamic historical track thereof.

With the foregoing in mind it is a principal object of the invention to provide an improved target tracking sonar system suitable for use as a hazard avoidance aid in the operation of high speed watercraft.

Another object of the invention is the provision, in a sonar system including pulse transmission and receiving means operable at a predetermined pulse repetition rate, of digital sonar signal processing means, including recirculating memory means, whereby data can be stored and then read out and displayed on a short persistance cathode ray tube at a display repetition rate, or frame rate, that is many times said pulse repetition rate, thereby avoiding flicker.

A further object is the provision of a sonar system of the foregoing character wherein the stored data may be regarded as a plurality of scan lines of information each corresponding to a successive within pulse scan of sonar data, and which data is updated at substantially the pulse repetition rate of the sonar by inserting a new line of data and, if the memory is full, dropping the oldest line of data, the newest line of data being inserted adjacent the previously inserted line, whereby the display is characterized by a historical track of target relative motion that has a natural appearing progression to a viewer, say as the carrying vehicle closes in range on a partially submerged floating target.

Still another object is the provision of a flicker-free hazard avoidance sonar system that employs inexpensive, readily available, compact and reliable solid state digital techniques in combination with an inexpensive and reliable cathode ray tube display means that utilizes line scanning in the manner of a television display, whereby inexpensive and conventional beam deflection circuitry can be employed.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Although it will be understood that signal processing and data display according to this invention may be utilized for other purposes, for the sake of illustration of a practical application of the invention it will be described in connection with a hazard avoidance sonar system.

Figure 1:
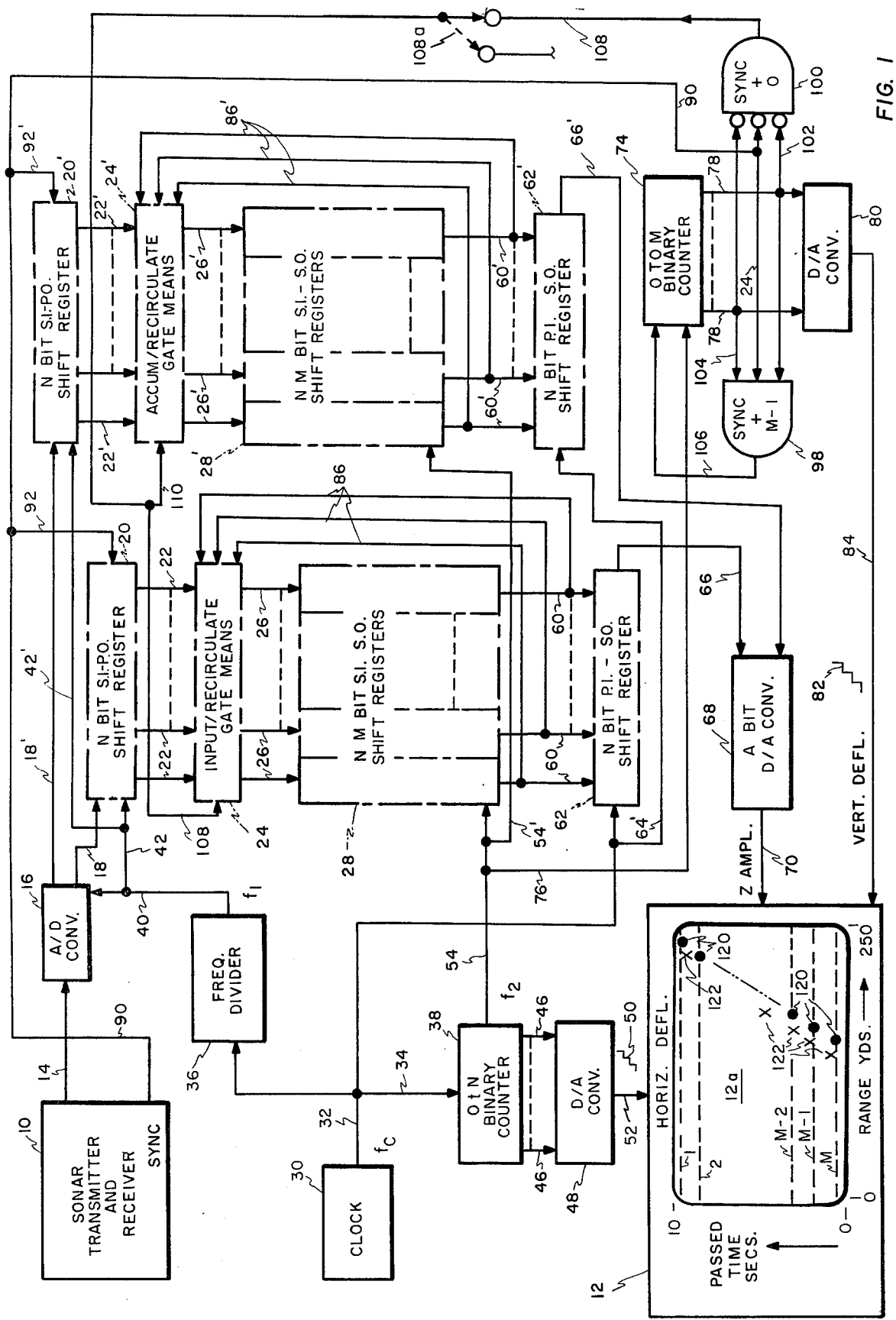
FIG. 1 is a diagrammatic illustration, in block form, of a hazard avoidance sonar system embodying the invention.

In the form of the invention illustrated in FIG. 1 and described hereinafter, there is provided a hazard avoidance sonar system generally indicated at S that serves to provide a visual indication of an object in the water ahead of the vessel in sufficient time for a corrective maneuver to be executed even though the vessel may be operating at relatively high speeds. The system S comprises signal processing and display means in association with a forward looking sonar transmitter and receiver 10. Transmitter and receiver 10 may be of any suitable construction wherein acoustic pulses or pings are projected into the water at a predetermined pulse repetition frequency. The display means, shown at 12, conveniently comprise a short persistence cathode ray tube and associated beam deflection means similar to those of a conventional oscilloscope or television set.

In a typical system embodying the invention, a sonar transmitter and receiver operating at a pulse repetition frequency of 3 Hz has been used. Echoes returning from objects in the path of projected acoustic energy are processed by the receiver portion of transmitter and receiver 10 in a conventional fashion to provide analog voltage signals with peaks that are characteristic of the existence of a target object in the water ahead. These analog signals are applied as shown by line 14 to an A bit analog to digital converter 16 which samples the signals at a predetermined rate and converts them to digital form. In the present example, in which A equals 2, analog to digital converter 16 provides a first output in the form of a series of binary codes pulses or bits, representative of analog voltage values above a first predetermined amplitude, and a second series of binary codes pulses, or bits, representative of analog voltage values having amplitude exceeding a second predetermined level. These series of digital information bits are applied as shown respectively by lines 18 and 18' to first and second N bit serial-input/parallel-output shift registers 20 and 20'.

The number N of stages in shift registers 20, 20' are determined by the desired range resolution of the system 10. Thus, each bit in the length of shift register 20 or 20' is representative of an increment of range. The N parallel binary digital outputs of register 20, represented by lines 22, are applied to input/recirculate gate means 24 which is adapted, at times that will later be described, to pass the parallel information as shown by lines 26 to the inputs of a corresponding number N of M bit serial-in/serial-out shift registers indicated collectively by reference numeral 28. Similarly, the parallel outputs of register 20' are connected as shown by lines 22', to an input/recirculate gate means 24', and by lines 26' to N M bit serial-in/serial-out shift registers indicated collectively at 28'.

The rate of sampling by analog to digital converter 16, the rate of shifting of registers 20 and 20', and the rate of shifting of registers 28 and 28' are derived by counting down from the output of a master clock 30. Master clock 30, which may conveniently comprise a square wave generating oscillator operating at a frequency $f_c$ is connected as shown by lines 32 and 34 to a frequency divider 36 and a zero to N binary counter 38, respectively. Counter 38 is preferably a binary digital counter having sufficient stages to count from 0 to N input bits in binary form. Frequency $f_c$ is selected so as to provide a flicker-free presentation on cathode ray tube display means 12, which is accomplished by providing a display at a frame rate of approximately 50 per second. As will presently be made apparent in the description of the mode of operation of system S, a frequency $f_c$ equal to 50 times the pulse repetition frequency times N, times M will produce the desired results. Frequency divider 36 provides a sampling and shifting input frequency $f_1$, via lines 40 and 42 to analog to digital converter 16 and to shift registers 20 and 20', that is equal to $f_c/50\,M$.

Counter 38, which conveniently comprises sufficient binary stages to count from 0 to N in binary form, has its binary count output represented by lines 46 connected as the input to a digital to analog converter 48. The output of digital to analog converter 48 constitutes a stairstep voltage signal 50 which is applied via line 52 to the horizontal deflection means of display means 12. Counter 38 resets itself to 0 after every N input bits and serves to divide $f_c$ by N as an output $f_2$ on lines 54 and 54' to control the shift rate of the M bit shift registers 28 and 28'.

The serial outputs of the M bit shift registers 28 are represented by N parallel lines 60, and are applied as parallel inputs to an N bit parallel-in/serial-out shift register 62. Shift register 62 is operated at frequency $f_c$ of master clock 30 which is connected thereto as shown by lines 32 and 64. The serial, binary digital output of shift register 62 is fed via line 66 as one input to an A bit digital to analog converter 68.

The outputs of M bit shift registers 28' are similarly connected as shown by lines 60' as parallel inputs to an N bit parallel-in/serial-out shift register 62' operated at frequency $f_c$ by shift signals received via line 64'. The digital serial output of shift register 62' is fed via line 66' as a second input to digital to analog converter 68.

Digital to analog converter 68 combines the outputs of registers 62 and 62' to provide a video, or Z axis, amplitude signal via line 70 to the cathode ray tube display means 12. This signal is utilized, in a manner which will be more fully detailed in the following description of the mode of operation of the system, to generate echo indications on the display means 12.

Vertical deflection signals for the cathode ray tube display means 12 are generated in timed relation to the generation of horizontal deflection signals 50 in such a manner that there is one line of vertical deflection occurring at the end of every N increments of horizontal deflection, it being noted at this point that one horizontal line consists of N deflection steps caused by stairstep signal 50. To this end, there is provided 0 to M binary counter 74 that is driven from counter 38 via lines 54 and 76 so as to be advanced one count for each N counts by counter 38. Counter 74 conveniently comprises a binary, digital counter, the binary output of which is represented by parallel lines 78 connected as the input to a digital to analog converter 80. Converter 80 provides a vertical deflection voltage signal 82, in stairstep form, which is applied via line 84 to the vertical deflection means of display means 12.

In order to provide flicker-free presentation by display means 12, the system S reads all the information out of each of the M bit shift registers 28 and 28' at a rate of 50 times a second. This readout is essentially nondestructive and is accomplished by recirculation of the digital information in the shift registers 28, 28'. Accordingly, the output of each shift register 28 is connected as shown by lines 86 to the gate means 24 for reapplication or reinsertion via lines 26 to the first stages of the same shift registers from which it came. Similarly, the outputs of shift registers 28' are connected as shown by lines 86' to gate means 24' for reinsertion via lines 26' into those shift registers.

In order to periodically update the digital information recirculating in shift registers 28 and 28', gate means 24 and 24' are periodically activated, at the sonar pulse repetition rate, to inhibit the reinsertion of digital data arriving via lines 86, 86', and to enable the insertion of digital data existing at that time in shift register 20 and shift register 20'. This accomplishes the elimination of the oldest display line of data and introduces a new line of display data. The resulting display, which will be described in more detail as this specification proceeds, will appear to be stationary with the exception of apparent upward movement at the rate of one video line for each sonar pulse repetition.

When implementing the foregoing data updating, the system S requires that two conditions be met concurrently. These are that the shift registers 20, 20' be full, and that the circulation of data in registers 28 and 28' be in such a state that the oldest data therein will be supplanted by the new data being inserted from registers 20 and 20'. To effect this, a sync signal is derived from sonar transmitter and receiver 10, which sync signal may conveniently comprise the receiver blanking signal that occurs at the time of pulse projection, and is applied as shown by lines 90, 92, and 92' to shift registers 20 and 20'. The sync signal so applied acts as a hold command to registers 20, 20' that causes them to momentarily cease shifting for a time corresponding to the sonar blanking signal. Because registers 20, 20' each comprise N stages, and because of the shifting rate dictated by the divider 36, the registers will be full during that holding period.

The sync signal derived from sonar transmitter and receiver 10 is further applied via lines 90, 94 as one input to each of two coincidence gates 98 and 100. Other inputs to each of coincidence gates 98, 100 are derived from the binary stages of counter 74, as shown by lines 102. For purposes which will become apparent from the description of the mode of operation of the system S, gate 98 is responsive to simultaneous occurrence of a sync signal and completion of a count of M-1 to produce a reset signal via line 106 that resets counter 74 to a zero, or no count condition. Gate 100 is responsive to simultaneous occurrence of a sync signal and resetting of counter 74 to said zero condition to provide, via lines 108, 110, an accumulate command signal to gate means 24 and 24' which are thereby enabled to transfer the digital data then existing in registers 20 and 20' to the first stages of the respective M bit shift registers 28 and 28'. In doing so, gate means 24 and 24' inhibit the recirculation of the data in the last stages of shift registers 28 and 28', that data being the oldest then in the system.

Counter 74 will reset itself to a count of 0 wherever a full count of M is completed. It will be recognized that this last will occur whenever there is no sync signal present at a count of M-1.

MODE OF OPERATION

Consider now that operation of system S is to be started will all of the registers in an empty condition or at least containing non-relevant data, and both of the counters 38 and 74 to be in their zero count condition. From this condition it will be necessary to run system S for a short period of time to fill registers 28, 28' with relevent data. With sonar transmitter and receiver 10 operating, and clock 30 operating, each sonar return signal on line 14 will be sampled by analog to digital converter 16 at the rate $f_1$ for amplitude conditions exceeding any of A amplitude levels, it being recalled that in this example A = 2. The digitized outputs of converter 16 are fed into serial-in/parallel-out shift registers 20 and 20', which registers become full at the end of each sonar receiving period as indicated by a sync signal at line 90. That signal causes registers 20 and 20' to hold the data therein until the sync signal terminates, after which they can accumulate data from the subsequent sonar return on line 14 and digitized by converter 16.

During the time required for shift registers 20 and 20' to become full, counter 38 has counted through the count of N a number of times, with each count of N resulting in a horizontal sweep of the cathode ray beam of display means 12, advancement of one count in counter 74, and advancement of registers 28 and 28' one stage each. Upon completion of a count M-1 in counter 74, and if a sync signal exists to indicate that registers 20 and 20' are full, a signal is generated by gate 98 on line 106 causing counter 74 to reset to zero earlier by a time equal to one count than it would if the sync signal did not exist. The resetting to zero during existence of a sync signal is sensed by gate 100 which produces a signal on line 108 to gate means 24 and 24', that results in transfer of data in registers 20 and 20' to registers 28 and 28', respectively. As such data moves into the first stages of registers 28 and 28', the oldest data in the last stages of those registers is inhibited from recirculation by gate means 24 and 24', thereby being removed from the system.

The foregoing process is repeated with each pulse repetition of sonar transmitter and receiver 10, filling registers 28 and 28' with relevant data. Thereafter, when additional data is transferred from registers 20 and 20' into the first stages of registers 28 and 28', the oldest data therein is displaced from the last stages thereof and inhibited by gate means 24 and 24' from being recirculated.

With each count of counter 74, digital to analog converter 80 provides a vertical deflection step in the vertical deflection voltage signal 82 thereby advancing the vertical deflection voltage signal 82 thereby advancing the vertical position of the cathode ray beam downward one line position in the display means 12. Inasmuch as counter 74 advances one count for each N counts of counter 38, from which the horizontal deflection signal 50 is derived by digital to analog converter 48, it will be recognized that a raster 12a will be generated on display means 12 comprising M horizontal scan lines each corresponding to the M stages of registers 28 and 28', and each line comprising N range increments corresponding to the N stages of registers 20 and 20'. Moreover, since master clock 30 operates at a frequency of 50 times M times N Hz, it will further be recognized that the display raster 12a will be regenerated at a frequency of 50 Hz.

All of the data in the N M bit shift registers 28 and 28' is completely recirculated at a rate of 50 Hz, and for each of the M steps in one circulation, N bits of parallel data are read out and serialized by shift registers 62 and 62'. The serialized data is fed via lines 66 and 66' to digital to analog converter 68 to be combined into an analog signal for application via line 70 to the Z or amplitude input of display means 12.

Because of the relationship of the shifting or registers 28 and 28' to the counting by counters 38 and 74, one line of N bits of data is read out simultaneously from each of the registers 28 and 28' for each horizontal deflection of the cathode ray beam of display means 12. When the data corresponding to any given line contains information characteristic of a sonar echo from the target object, the corresponding increase in the amplitude signal on line 70 is converted by the cathode ray beam of display means 12 to a bright spot, or pip, at a point in the horizontal deflection corresponding to the range of the object from the sonar transmitter and receiver. A series of such pips are indicated at 120 on the display 12a. The pip 120 on line 1 corresponds to the oldest displayed data of a given target object. The second pip 120 on line 2 corresponds to the next oldest data, in point of time, of the same object. The pip 120 on line M corresponds to the most recent data on the same object. It will be seen therefore, that the display 12a provides a characteristic pattern of a target object consisting of a number of pips that are aligned to present a pattern, the slope of which is determined by the speed at which range to the target the object is closing. This form of display provides the quickest recognition to an operator of the presence of the target, the rate at which the range is closing, the immediate or zero time range of the target, and by interpolation downward, the amount of time available before the target will be reached.

Once the shift registers 28 and 28' are full of data, they are updated once each pulse repetition period by new data accumulated in shift registers 20 and 20', on the occasion of a concurrence of a sync signal and the oldest row of N bits of data being in the Nth stages of the registers 28 and 28'. When that situation occurs, as sensed by gate means 98, counter 74 is reset to its zero condition and gate 100 provides a signal to cause gate means 24 and 24' to inhibit the entry of the oldest data from registers 28 and 28' while at the same time enabling transfer of data from registers 20 and 20' to the first stages of registers 28 and 28'. Because counter 74 is set to the zero condition one count earlier than during normal recirculation, all of the data in registers 28 and 28' is advanced one stage before again being displayed. The result is that the pips 120 each appear to move upwardly one line on the display to the positions indicated by the X's 122. Thus, the oldest data on line 1 has been replaced by the data that had been on line 2. Likewise, the data that had been the newest data on line M appears on line M-1, while the newly inserted data appears on line M. From the foregoing it will be seen that the display 12a will appear to be stationary except for an upward pregression of one line for each pulse repetition period of the sonar transmitter and receiver. Inasmuch as this occurs in the example being described at a rate of three per second, and since the number M of lines in the raster may be considerable, the progression rate will appear quite smooth. Because the complete raster is generated at a rate of 50 Hz, there will be no flicker.

Although the system S has been described as being capable of sensing two amplitude levels A, it will be understood that the system may use only a single amplitude level of detection in which case those elements indicated by reference characters having a prime mark may be omitted. On the other hand, more than two levels of amplitude may be desired for aid in target size or character classification in which case additional elements corresponding to registers 20', 28', 62', and gate means 24' may be incorporated.

Also, as mentioned earlier, the number N of stages in registers 20 and 20' and the corresponding number of M bit serial-in/serial-out shift registers 28 will be selected to provide the desired degree of range resolution. Similarly, the number M of stages to be used in registers 28 and 28' will be determined by the desired number of horizontal lines to be used in the display.

At times it may be desirable to freeze the display to study its content. This may be readily accomplished by moving a switch 108a, in line 108, to its dotted line position, thereby ensuring that the gate means 24, 24' remain in their recirculate mode irrespective of the output of gate 100. New data will not be inserted, therefore, and all data in the system will continue to be recirculated and displayed as it was at the time switch 108a was moved.

From the foregoing, it will be appreciated that there has been provided by the invention an improved signal processing and display means which achieves the aforementioned objects and advantages and is particularly well suited for use in a hazard avoidance, target tracking sonar system. The invention may, of course, be used in other systems for providing a historical, flicker free display of data that is available at intervals that would ordinarily produce flicker in a display.

Figure 2:
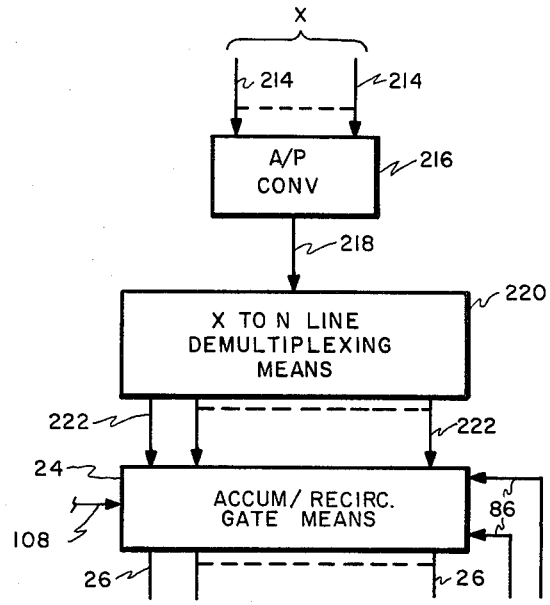
FIG. 2 is a fragmentary diagrammatic illustration of a modified embodiment of the invention.

In some applications it may be desirable to receive a plurality of parallel, or multiple line inputs. Referring to FIG. 2, a plurality of data input lines 214, X in number, are connected to an analog to digital convnerter 216. Converter 216 has its digitized output connected, as shown by line 218, to an X to N line demultiplexer 220 that serves to provide the necessary N parallel inputs via lines 222 to accumulate/recirculate gate means 24. Gate means 24 is connected via lines 26 to the remainder of a system as described with reference to FIG. 1.

Figure 3:
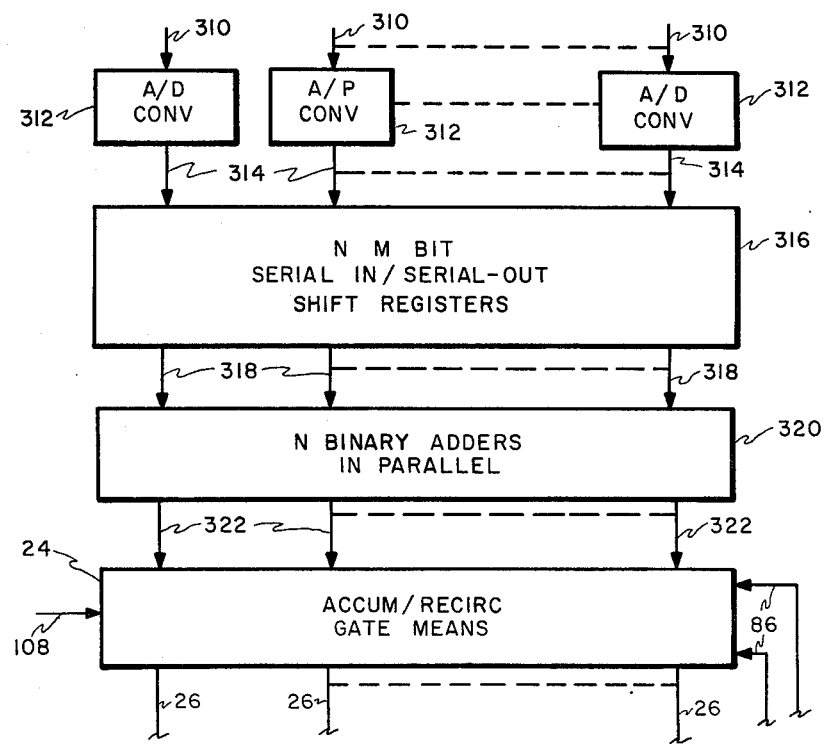
FIG. 3 is a fragmentary diagrammatic illustration of another embodiment of the invention.

Another variation is illustrated in FIG. 3 wherein a plurality, N in number, of parallel analog data inputs are shown by lines 310. These inputs may be representative, for example, of sonar returns from discrete directions in a system wherein bearing, as well as range, is to be displayed. The inputs are digitized by converters 312 to provide N parallel, digital outputs 314 to N M bit serial-in/serial-out shift registers, shown collectively at 316. The registers 316 feed, via lines 318, N binary adders 320 that have their outputs connected, as shown by lines 322, to accumulate/recirculate gate means 24. Gate means 24 is connected to the remainder of a system substantially as described with reference to FIG. 1. By appropriate timed operation of the shifting of the digitized data, and generation of the cathode ray tube display, a presentation of range and bearing can be readily effected.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. Apparatus for generating a flicker free, dynamic, historical display fro a source of analog signals provided within predetermined time periods occurring at a first repetition rate, and a source of sync signals directly related to said first repetition rate, said apparatus comprising:
a source of timing signals;
analog to digital converter means, connected to receive said analog signals, for providing signals in the form of binary data bits representative of said analog signals;
first register means, connected to said analog to digital converter means and responsive to said timing signals, for receiving and collecting a group of said binary data bits for each of said predetermined time periods and operative to arrange said binary data bits in each group in parallel form;
second register means, coupled to said first register means and responsive to said timing signals, for accumulating a predetermined number of said groups of parallel binary data bits, said second register means being adapted to have all said binary data groups accumulated therein to be read out nondestructively at a predetermined second repetition rate a plurality of times during each of said predetermined time periods;
third register means, coupled to said second register means and responsive to said timing signals, for effecting sequential reading out of groups of data bits from said second register means and converting each of said groups of binary data bits into series form;
first digital to analog converter means, connected to said third register means, for converting the series binary data bit output of said third register means into analog output signals;
display means, connected to be responsive to said timing signals and to said analog output signals, for generating a visual display of analog values at said second repetition rate, said second repetition rate being substantially greater than said first repetition rate;
first gate means, coupling said first and second register means, for substituting a new group of binary data bits for the oldest group of binary data bits in said second register means once for each of said predetermined time periods; and
logic means, responsive to said sync signals, for controlling said first gate means.

2. Apparatus as defined in claim 1, and wherein:
said first register means comprises serial-in/parallel-out shift register means having N binary stages; and
said second register means comprises N serial-in/serial-out shift register means each having M binary stages.

3. Apparatus as defined in claim 2, and wherein:
said first gate means is further connected between the Mth stages of said N serial-in/serial-out shift register means and the first stages thereof;
said first gate means being operative, under the control of said logic means, to normally direct said groups of binary data bits from said Mth stages to said first stages whereby all data in said second register means is recirculated and reach out a plurality of times during each of said predetermined time periods.

4. Apparatus as defined in claim 3, and wherein:
said third register means comprises a parallel-in/serial-out shift register having N binary input stages.

5. Apparatus as defined in claim 4, and wherein:
said source of timing signals comprises means for generating first frequency timing signals ($f_c$), and means for deriving second and third frequency timing signals ($f_1$), ($f_2$), respectively, from said first frequency timing signals;
the frequency of said first frequency timing signals being equal to the product of said second repetition rate times N times M;
the frequency of said third frequency timing signals being equal to the frequency of said first frequency timing signals divided by N; and
the frequency of said second frequency timing signals being equal to the frequency of said first frequency timing signals divided by M times said second repetition rate.

6. Apparatus as defined in claim 5, and wherein:
said first register means is responsive to said second frequency timing signals;
said second register means is responsive to said third frequency timing signals; and
said third register means is responsive to said first frequency timing signals.

7. Apparatus as defined in claim 6, and wherein:
said means for deriving second and third frequency timing signals from said first frequency timing signals comprise a frequency divider and a first binary counter, respectively;
said first binary counter being adapted to provide counts from zero to N; and
said apparatus further being characterized by said logic means comprising a second binary counter connected to receive said third frequency timing signals from said first binary counter, said second binary counter being adapted to provide counts from zero to M.

8. Apparatus as defined in claim 7, and wherein:
said logic means comprises second and third gate means connected to said second binary counter and to receive said sync signals;
said second gate means being responsive to coincidence of a count corresponding to M-1 and presence of a sync signal to reset said second binary counter to zero substantially one count period earlier than if it would is said coincidence did not occur; and
said third gate means being responsive to coincidence of setting of said second binary counter to zero and presence of a sync signal to cause said first gate means to pass the group of binary data bits then in said first register means into the first stages of said second register means in place of the oldest group of binary data bits from the last stages of said second register means.

9. Apparatus as defined in claim 8, and further comprising:
second and third digital to analog converter means, connected to said first and second binary counters respectively, for converting the counts in said first and second binary counters into first and second deflection signals for said display means.

10. Apparatus as defined in claim 9, and wherein:
said display means comprises a cathode ray tube display that is responsive to said first and second deflection signals to generate a raster, and is responsive to said analog output signals to generate a visual presentation corresponding to said analog input signals.

11. A sonar system of the character described comprising:

a source of first analog signals representative of echoes from objects, said echoes being received during predetermined time periods occurring at a predetermined first repetition rate, and said echoes occurring at times during said time periods corresponding to ranges of said objects;

a source of sync signals corresponding to ends of said predetermined time periods;

a source of clock signals and a plurality of binary counters for providing timing signals at a plurality of frequencies;

an analog to digital converter for converting said first analog signals into serial binary data bit signals;

a serial-in/parallel-out first shift register having N binary stages for converting groups of said serial binary data bit signals into groups of parallel binary data bit signals, each of said groups corresponding to one of said predetermined time periods;

N serial-in/serial-out shift registers disposed in parallel with one another, each comprising M binary stages, and each responsive to said timing signals to shift through said M stages at second predetermined repetition rate;

an accumulate/recirculate gate means having the output of said serial-in/parallel-out shift register as a first input and the contents of the last stages of said N serial-in/serial-out shift registers as a second input, said gate means being responsive to control signals to apply said first or second inputs thereto alternatively to the first stages of said N serial-in/serial-out shift registers;

control logic means, responsive to one of said counters and to said sync signals to provide said control signals to said gate means whereby data from said last stages of said N serial-in/serial-out shift registers is reinserted into the first stages thereof at said second predetermined rate during said predetermined time periods, but is replaced by data from said serial-in/parallel-out shift register once for each sync signal, whereby all data in said N serial-in/serial-out shift registers is recirculated a number of times for each of said predetermined time periods, but is updated once for each such predetermined time period by replacing of the oldest data therein with new data at said first repetition rate;

a parallel-in/serial-out shift register, responsive to said timing signals, connected to said last stages of said N serial-in/serial-out shift registers and operative to convert groups of parallel binary data bit signals to serial binary data bit signals;

a first digital to analog converter connected to said parallel-in/serial-out shift register for converting the serial binary data bit signal output thereof into analog output signals;

second digital to analog converter connected to one of said binary counters and operative to provide first deflection signals;

a third digital to analog converter connected to another of said binary counters and operative to provide second deflection signals; and a cathode ray tube display means, connected to be responsive to said first and second deflection signals and to said analog output signals to provide a historic and dynamically changing display of said echoes in terms of range and time, said display having a frame rate equal to said second repetition rate, said second repetition rate being greater than said first repetition rate.

* * * * *